United States Patent [19]

Sanderson

[11] 4,237,500
[45] Dec. 2, 1980

[54] METHOD OF CONTROLLING THE POSITION OF A WRITE-READ HEAD AND DEVICE FOR CARRYING OUT THE METHOD

[75] Inventor: Hendrik J. Sanderson, Eindhoven, Netherlands

[73] Assignee: U.S. Philips Corporation, New York, N.Y.

[21] Appl. No.: 6,061

[22] Filed: Jan. 24, 1979

[30] Foreign Application Priority Data

Feb. 6, 1978 [NL] Netherlands ............... 7801318

[51] Int. Cl.³ .................................... G11B 21/10
[52] U.S. Cl. .................................... 360/77; 360/78
[58] Field of Search ............ 360/78, 77, 75, 10, 360/70, 84

[56] References Cited
U.S. PATENT DOCUMENTS 4,141,047  2/1979  Kambara et al. .................. 360/77
4,141,048  2/1979  Kubota et al. .................... 360/77
4,143,405  3/1979  Kubota ............................ 360/77

Primary Examiner—Alfred H. Eddleman
Attorney, Agent, or Firm—Thomas A. Briody; William J. Streeter; Edward W. Goodman

[57] ABSTRACT

A method and apparatus for controlling the position of write-read heads with which information is recorded in a plurality of parallel tracks on a record carrier. In accordance with the invention a tracking signal is recorded in at least selected tracks during a first time interval. When the next track is written the supply of write signals to the write-read heads is interrupted for a second time interval, the first and second time intervals being selected in such a way that the track portions corresponding to said two time intervals adjoin each other. During the second time interval the cross-talk signal produced in the write-read head by the recorded tracking signal is measured and employed to produce a control signal for positioning the write-read heads.

8 Claims, 8 Drawing Figures

METHOD OF CONTROLLING THE POSITION OF A WRITE-READ HEAD AND DEVICE FOR CARRYING OUT THE METHOD

BACKGROUND OF THE INVENTION

The invention relates to a method of controlling the position of a write-read head(s), which cooperate(s) with a record carrier on which consecutively adjacent parallel information tracks are to be written.

In systems in which information is recorded in adjacent tracks and is subsequently read, in particular systems which employ a magnetic record carrier in the form of a tape on which for example video signals are recorded and subsequently read and in which the tracks make an (generally small) angle with the longitudinal axis of the record carrier, it is essential that during reading the write-read head accurately follows the desired track. This is essential since, in order to increase the information density, increasingly smaller track pitches are selected and the tracks are written directly adjacent each other, i.e. without intermediate space, while at the same time, the width of the tracks is reduced continually. In order to ensure accurate tracking during the reproduction of the information, various control systems have been proposed, which control the relative position of the read head with respect to the record carrier transverse to the tracks during reproduction.

However, it has been found that it is equally essential to ensure that, during recording of information on such record carriers, the recorded tracks exhibit a most uniform pattern, i.e. that the track pitches are constant to the highest possible degree. This is of particular importance for the compatibility of the record carriers, i.e. the possibility of reproducing information recorded on a record carrier by means of an apparatus other than that with which it has been recorded. Furthermore, this becomes more important as the desired spacing between the tracks is reduced, because then there is a risk that the information signals of two consecutive tracks are fully or partly superimposed.

It is therefore also desirable to control the position of the write-read head transverse to the track direction during recording of information on the record carrier, so as to obtain the desired uniform track configuration as exactly as possible. This is especially desirable if for the positional control of the write-read heads during playback the write-read heads are not mounted rigidly in the direction transverse to the tracks, because then the position of these heads in this direction is not accurately defined during recording.

A method of obtaining this positional control of the write-read head during the recording of information on such a record carrier has been described previously in U.S. Pat. No. 3,845,500. The system described in this patent employs an additional servo track at the edge of the tape-like record carrier, in which servo track synchronizing marks are recorded. During the recording of information on the record carrier, the write-read head first scans this servo track, i.e. the synchronizing mark associated with the information track to be written, a control signal being derived from the detected relative position between the write-read head and said synchronizing mark, which control signal controls the position of the write-read head at the beginning of the information track.

Thus, this known system requires the presence of at least one servo track at the edge of the record carrier, which is obviously at the expense of the amount of information that can be recorded on the record carrier. Moreover, this system makes it necessary to record the synchronizing marks in the servo track before information can be recorded in the information tracks. Finally, this system requires a considerable amount of additional high-precision electronic circuitry.

SUMMARY OF THE INVENTION

It is the object of the invention to provide a method of controlling the position of the write-read head during the recording of information on a record carrier without the necessity of an additional servo track and of additional processing of the record carrier before the recording of information.

For this the invention is characterized in that during writing of an information track, a tracking signal is recorded for at least a first time interval, and during writing of a subsequent information track, the supply of a write signal to the write-read head is interrupted for a second time interval, the first and second time intervals during writing of these two consecutive information tracks being selected so that the portion of the first-mentioned information track corresponding to the first time interval adjoins the portion of the next information track corresponding to the second time interval, and that during writing of said last-mentioned information track in the second time interval the cross-talk signal produced in the write-read head by the tracking signal recorded in the preceding information track is detected and employed for generating a control signal for the position of the write-read head(s).

In this respect a tracking signal is to be understood to mean a signal of such a frequency that, during scanning of a specific track by the write-head, the tracking signal recorded in the preceding track produces a signal in said write-read head. The frequency to be selected therefore obviously depends on the desired spacing between adjacent tracks, which may be zero, and on the construction of the write-read head. Generally, this means that the wavelength of the tracking signals should be of at least the same magnitude as the track pitch. Moreover, it is obvious that the frequency of the tracking signal should be situated outside the frequency band occupied by the information recorded on the record carrier.

Thus, the invention does not utilize a servo track but tracking signals within the information tracks. Since the portion of an information track corresponding to the second time interval adjoins the portion of the preceding information track corresponding to the first time interval, a signal is produced in the write-read head as a result of cross-talk of the tracking signal in said preceding track during said second time interval. Furthermore, in accordance with the invention, no write signal is applied to the write-read head during said second time interval, i.e. the write process is interrupted. Thus, it is achieved that during said second time interval signal supplied by the write-read head is caused solely by the cross-talk signal. If the supply of the write signal during said second time interval were not interrupted, the signal supplied by said write-read head would comprise a component produced by said write signal, which has a substantially higher amplitude than the component as a result of the cross-talk signal, which would considerably complicate detection of said cross-talk signal. Furthermore, a write signal applied to the write-read head would give rise to substantial noise of a generally wide-band nature in the simultaneously detected output signal of said write-read head, which could impair detection of the cross-talk signal.

In accordance with a first preferred variant of the inventive method, during writing of each track, a tracking signal is recorded for an interval corresponding to the first time interval and, moreover, during writing of each track the supply of a write signal to the write-read head is interrupted for an interval corresponding to the second time interval, and during said second time interval the cross-talk signal resulting from the tracking signal in the preceding track is detected. This variant ensures the most effective positional control of the write-read heads. However, there are systems where interruption of the supply of the write signal during writing of each track gives rise to problems, in which systems this interruption is effected only for specific selected tracks, as will be described in more detail hereinafter.

With the method in accordance with the invention, the tracking signals written in the consecutive tracks during the recording of the information can be used effectively for the positional control of the write-read head during information reading. As an example German Offenlegungsschrift 2530482, which corresponds to U.S. Pat. No. 4,056,832, describes a system for controlling the head position during reading of a record carrier, employing tracking signals which have been written in consecutive tracks during recording. These tracking signals extend over the full track length and consequently also comprise the track portion corresponding to the first time interval. When a specific track is written the signal produced in the write-read head as a result of cross-talk of the tracking signal recorded in the preceding track can therefore be detected during the second time interval and can be employed for producing a control signal for positioning said write-read head. As these tracking signals have different frequencies in consecutive information tracks, it is generally desirable to use a band-pass filter which is tuned to the frequency of the relevant tracking signal for the detection of the cross-talk signal.

It is to be noted that another Netherlands Patent Application 7702815, which has not yet been laid open for public inspection, and which corresponds to U.S. Patent application Ser. No. 880,437 filed Feb. 23, 1978, describes a method of controlling the position of the write-read head which also employs tracking signals of different frequencies in consecutive information tracks. The possibility is also mentioned of obtaining a control signal for positioning the write-read head during recording of the record carrier by detection of the cross-talk signal from the preceding track. However, this detection is performed during the full scanning time of a track and not, as is the case with the present invention, during an interval in which no write signal is applied to the write-read head.

In accordance with a further preferred variant of the inventive method, the tracking signal recorded always has the same frequency during each first time interval. Thus, in accordance with this variant, a specific tracking signal intended for head-position control during recording is recorded during every first time interval. As for head-position control, only one cross-talk signal, namely the cross-talk signal from the preceding track, may be detected, a tracking signal of the same frequency may be used in each track, which means a simplification of the circuitry required for the detection of the cross-talk signal.

It is obvious that for determining the second and, as the case may be, the first time intervals during the writing of the information tracks, keying signals are required, which inter alia should ensure that the supply of write signals to the write-read head is interrupted during the second time interval. These keying signals can be generated with the aid of a logic circuit, which is always triggered at the beginning of an information track and in response thereto supplies a keying pulse at the desired instant and for the desired duration. In order to simplify the logic circuit required for this purpose and also to minimize interference of the track portions corresponding to the second time interval with the information recorded in the information tracks, the length of the second time interval is preferably selected so that the track portion corresponding to said second time interval has a length which is at the most equal to the mean value of the offset of consecutive tracks in the track direction relative to each other. As a result of this it is possible to position the track portions corresponding to said second time intervals in such a way relative to the beginning of each of the information tracks that the pattern of these track portions, considered over a plurality of tracks, is substantially parallel to the disposition of the beginnings of the information tracks. If the offset of consecutive tracks in the track direction is always the same, it is then possible to employ second time intervals which correspond to track portions which have a constant distance to the beginning of each relevant information track, so that in this case a logic circuit which is triggered at the beginning of each information track for supplying the keying pulse for the second time interval may be of very simple design.

When a video signal is recorded on a record carrier, in accordance with a further preferred variant, the second time interval during writing of each track is situated within the field blanking interval after the field synchronizing pulse of the video signal. Thus it is achieved that the basic signal content of the video signal is not affected, because in this period the picture is suppressed during reproduction of the video signal.

There are various possibilities of obtaining the control signal from the detected cross-talk signal. As an example, the amplitude of the detected cross-talk signal may be compared with a reference value. However, the control signal thus obtained depends on the response of the write-read head, which may differ for different heads and which may change as a function of time. Therefore, in accordance with a further preferred variant of the inventive method, the control signal for positioning the write-read head is obtained by comparison of the cross-talk signal which is detected in the second time interval during writing of an information track with a cross-talk signal which is detected in a preceding second time interval during writing of a preceding information track.

The invention also relates to apparatus for carrying out the method, comprising a write-read head for recording information on the record carrier, positioning means for controlling the relative position of the write-read head with respect to the information tracks in a direction transverse to said information tracks, and a control circuit for generating and applying a control signal to said positioning means.

An embodiment of said apparatus is characterized in that the apparatus is provided with a signal generator for, at least during each first time interval, applying a tracking signal to the write-read head, switching means for interrupting the supply of signals to the write-read head during each second time interval, detection means for detecting the cross-talk signal during each second time interval and applying the detected signal to the control circuit.

In accordance with a further embodiment the apparatus is characterized in that the control circuit is provided with an amplitude detector for determining the amplitude of the cross-talk signal, a first and a second sample-and-hold circuit coupled to the amplitude detector, an actuating circuit for alternately actuating said first and second sample-and-hold circuits during consecutive second time intervals, and a differential amplifier for adding the output signals of the first and the second sample-and-hold circuit to each other with opposite polarity so as to obtain the control signal.

DESCRIPTION OF THE DRAWINGS

The invention will now be described in more detail with reference to the Figures, in which

FIG. 5 shows a track configuration with an additional tracking signal, while

DESCRIPTION OF THE PREFERRED EMBODIMENTS

Figure 1:
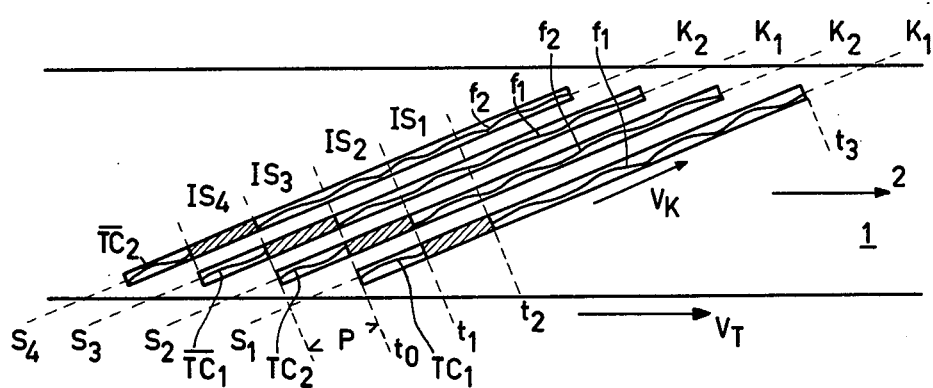
FIG. 1 shows a first track configuration.

The track configuration shown in FIG. 1 is based on so-called helical-scan recording on a magnetic record carrier 1 in the form of a tape, the tracks making a specific (generally small) angle with the longitudinal direction 2 of said record carrier 1. For this purpose the record carrier 1 is completely or partly passed around a drum in accordance with a helix, in known manner, in which drum for example two write-read heads rotate, which scan the record carrier in accordance with the track configuration shown.

For the track configuration shown in FIG. 1, it is furthermore assumed that the record carrier 1 is moved in a direction $V_T$, while the write-read heads are moved in the direction $V_K$, so that consecutively the information tracks $S_1$, $S_2$, $S_3$ and $S_4$ are scanned.

Furthermore, it is assumed that in each information track a tracking signal is recorded in a manner as described in the cited U.S. Pat. No. 4,056,832 with reference to FIG. 6. For positioning the write-read heads during reading of the record carrier, a tracking signal $TC_1$ with a frequency $f_1$, a tracking signal $TC_2$ with a frequency $f_2$, a tracking signal $\overline{TC_1}$ with the frequency $f_1$ but in phase opposition to the tracking signal recorded in the track $S_1$, and a tracking signal $\overline{TC_2}$ with a frequency $f_2$ but in phase opposition to the tracking signal recorded in track $S_2$, are consecutively recorded one in each of four consecutive information tracks $S_1$ through $S_4$, which results in the pattern of tracking signals shown in FIG. 1. The presence of a tracking signal within the information tracks is indicated by the waveforms $TC_1$ through $\overline{TC_2}$, the different frequencies also being indicated.

In accordance with the invention no write signal is applied to the write-read heads for a specific time interval during writing of each information track $S_1$ through $S_4$. In each information track this results in a track portion in which no signal is recorded. Said time intervals are now selected with respect to the instant at which they begin relative to the beginning of scanning the track, so that in each track the track portion corresponding to said time interval adjoins a track portion of the preceding track in which a tracking signal has been recorded. In the Figure the track portions corresponding to said time intervals are shown hatched, so that in the consecutive tracks $S_1$, $S_2$, $S_3$ and $S_4$ the track portions $IS_1$, $IS_2$, $IS_3$ and $IS_4$ are not recorded on. From the Figure it is evident that, for example, the track portion $IS_2$ in track $S_2$ adjoins the track portion of track $S_1$ which precedes the track portion $IS_1$. The tracking signal $TC_1$ with the frequency $f_1$ has been recorded in this portion of track $S_1$, which adjoins the track portion $IS_2$ of track $S_2$, as is indicated by the waveform. This tracking signal in track $S_1$ results in a cross-talk signal in the write-read head during scanning of the track portion $IS_2$ of track $S_2$. For this purpose said tracking signal should have a wavelength which is at least equal to the track spacing between the tracks. Since, during scanning of the track portions $IS_1$, $IS_2$, $IS_3$ and $IS_4$, the write process is completely interrupted, the signal produced in the write-read head during said time intervals entirely depends on this cross-talk signal, which enables an effective detection of said cross-talk signal to be obtained.

Figure 2:
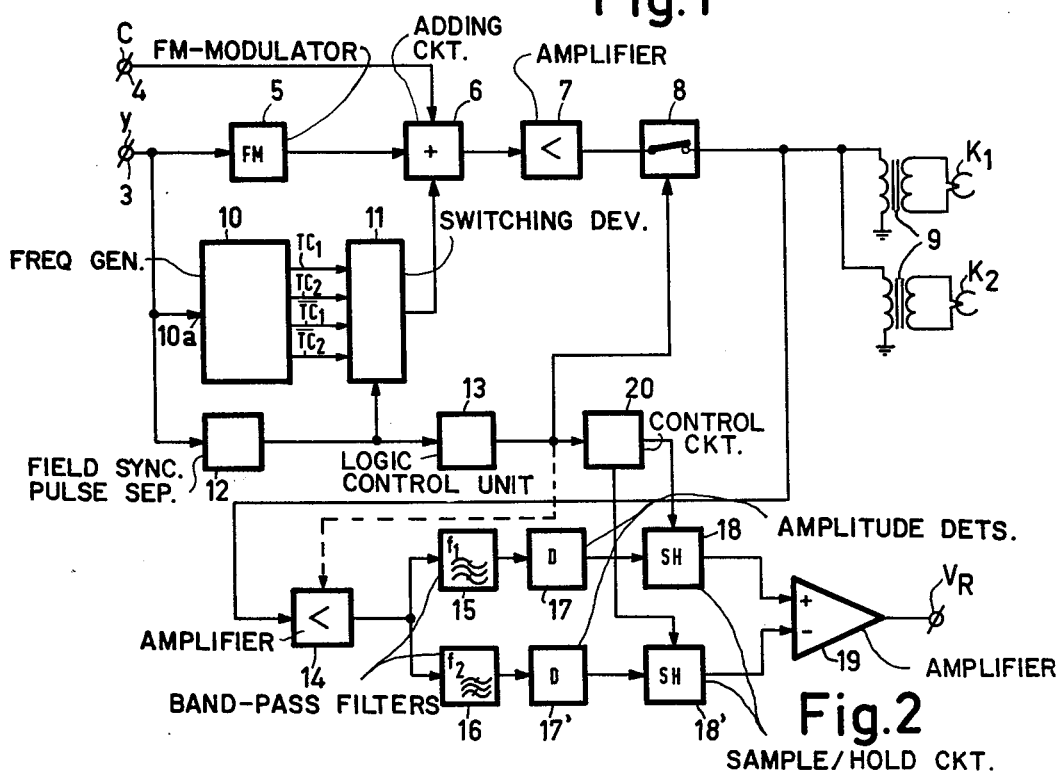
FIG. 2 shows the apparatus for obtaining said track configuration and producing a control signal for the positioning means.

FIG. 2 shows an apparatus for obtaining the track configuration in accordance with FIG. 1 and for producing the control signal for positioning the write-read heads. It is assumed that the apparatus is employed for recording a color television signal, the luminance signal being frequency-modulated on an FM-carrier wave and the chrominance signal on a chrominance carrier wave which is situated below the first-order side band of the modulated luminance signal.

The apparatus comprises an input terminal 3 to which the luminance signal Y is applied, which is modulated on said FM carrier wave in an FM modulator 5. The chrominance signal C, which is modulated on the chrominance carrier, is applied to an input terminal 4 and is added to the frequency-modulated luminance signal in an adding circuit 6. The output signal of said adding circuit 6 is applied to the write-read heads $K_1$ and $K_2$ via a write amplifier 7, a switch 8, and a rotary transformer 9. For the present embodiment, although this is by no means essential for the invention, it is assumed that the apparatus is provided with two write-read heads $K_1$ and $K_2$. These write-read heads are situated at positions in the head drum which are 180° offset in known manner, while the record carrier is passed along half the drum circumference only. Consecutive information tracks on the record carrier are therefore alternately scanned by the write-read heads $K_1$ and $K_2$, so that in the case of the track configurations shown in FIG. 1 the tracks $S_1$ and $S_3$ are scanned by the write-read head $K_1$ and the tracks $S_2$ and $S_4$ by the write-read head $K_2$.

The tracking signals are generated with the aid of a generator 10, which at four outputs supplies the tracking signals $TC_1$, $TC_2$, $\overline{TC_1}$ and $\overline{TC_2}$, intended for four consecutive information tracks, which respectively have a frequency $f_1$, $f_2$, $f_1$ and $f_2$, while, as previously stated, the tracking signal $\overline{TC_1}$ and $\overline{TC_2}$ respectively have a frequency $f_1$ and $f_2$ but are inverted relative to the tracking signals $TC_1$ and $TC_2$ respectively. The frequencies $f_1$ and $f_2$ may be locked to the line synchronizing frequency of the television signal, for which purpose the generator has an input 10a to which the luminance signal Y is applied, from which the line synchronizing pulses for synchronizing the generator can be separated.

The four tracking signals $TC_1$ through $\overline{TC_2}$ are applied to a switching device 11, which, during consecutive track scanning periods, successively transfers these tracking signals $TC_1$ through $\overline{TC_2}$ to its output, which is connected to the adding circuit 6 for adding the desired tracking signal to the color television signal to be recorded. Since, in the track configuration shown in FIG. 1 when two write-read heads are used, one field per track is recorded, which approximately begins with the field synchronizing pulse, a suitable control signal for the switching device 11 can simply be derived from the luminance signal Y with the aid of a field-synchronizing pulse separator 12.

In order to obtain the interruption intervals of the write process resulting in the track portions $IS_1$, through $IS_4$ without signal content, a switch 8 is included between the write amplifier 7 and the rotary transformer 9, which switch is controlled by a logic control unit 13. This logic control unit 13 has been programmed in such a way that during scanning of the consecutive tracks it supplies keying pulses during the desired intervals $IS_1$ through $IS_4$, by which pulses the switch 8 is opened, so that during said intervals no signal is applied to the write-read heads. Instead of an additional switch 8 at the output of the write amplifier 7 it is of course also possible to turn off the write amplifier 7 during these intervals. As the position of the intervals $IS_1$ through $IS_4$ is always related to the beginning of the relevant information track, the field sybchronizing pulse train may be employed as the control signal for the logic control unit 13.

In order to detect the cross-talk signal produced in the write-read heads $K_1$ and $K_2$ by the tracking signal of the preceding track during the intervals $IS_1$ through $IS_4$, the apparatus comprises a read amplifier 14 which is coupled to the rotary transformer 9. The output of said read amplifier 14 is coupled to two band-pass filters 15 and 16, which have a narrow pass-band around the frequency $f_1$ and $f_2$ respectively. Each of said band-pass filters 15 and 16 is coupled to an amplitude detector 17 and 17' respectively, which in their turn are each connected to a sample-and-hold circuit 18 and 18' respectively. These sample-and-hold circuits 18 and 18' in their turn are connected to a differential amplifier 19, at whose output terminal the desired control signal $V_R$ is available. Finally, the sample-and-hold circuits 18 and 18' are controlled by a control circuit 20, which in its turn receives a control signal from the control unit 13, which control circuit 20 alternatively energizes the sample-and-hold circuits 18 and 18' as the consecutive tracks $S_1$ through $S_4$ are scanned during the interruption intervals $IS_1$ through $IS_4$.

The operation of the apparatus will now be explained with reference to FIG. 1. When track $S_1$ is scanned, the tracking signal $TC_1$ is added to the color television signal via the switching unit 11 and is recorded together with said television signal by the write-read head $K_1$, said recording process being interrupted during the interval $IS_1$ by opening the switch 8. When subsequently track $S_2$ is scanned by the write-read head $K_2$, the tracking signal $TC_2$ is added to the color television signal via the switching unit 11. During the interval $IS_2$ the write process is again interrupted by opening the switch 8. In this interval $IS_2$ the signal supplied by the write-read $K_2$ is almost completely determined by the cross-talk signal as a result of the tracking signal $TC_1$ in the track $S_1$. This cross-talk signal with the frequency $f_1$ is amplified by the read amplifier 14 and transferred to the amplitude detector 17 via the band-pass filter 15. During this interval $IS_2$ the sample-and-hold circuit 18 is activated, so that the amplitude of the cross-talk signal measured in said interval $IS_2$ is stored in a storage element, for example a capacitor. Thus, after said interval $IS_2$ a signal is available at the output of said sample-and-hold circuit 18 which represents the amplitude of the cross-talk signal from track $S_1$ and which is consequently a measure of the track spacing between track $S_2$ and track $S_1$ during the interval $IS_2$.

When the next track $S_3$ is scanned, the next tracking signal $\overline{TC_1}$ is recorded together with the color television signal by the write-read head $K_1$ via the switching unit 11, while by opening the switch 8 the write process is interrupted again during the interval $IS_3$. During said interval $IS_3$ the write-read head $K_1$ supplies the cross-talk signal with a frequency $f_2$, produced as a result of the tracking signal $TC_2$ in the track $S_2$, to the read amplifier 14, which via the band-pass filter 16 is transferred to the amplitude detector 17'. During this interval $IS_2$ the sample-and-hold circuit 18' is activated, so that the amplitude of the cross-talk signal measured in said interval $IS_3$ is stored.

Thus, after said interval $IS_3$ a signal is available at the output of the sample-and-hold circuit 18' which represents the amplitude of the cross-talk signal from track $S_2$ and is consequently a measure of the track spacing between track $S_3$ and track $S_2$ during said interval $IS_3$.

For obtaining a control signal for the positioning of the write-read heads $K_1$ and $K_2$, it suffices to compare the signal at the output of the sample-and-hold circuit 18' with the signal at the output of the sample-and-hold circuit 18, which is done by applying these two signals to the differential amplifier 19. When the tracks $S_1$ and $S_2$ and the tracks $S_2$ and $S_3$ are situated at equal distances relative to each other, the output signal $V_R$ of the differential amplifier 19 will be zero. When the relevant track distances are not equal, the polarity of the signal $V_R$ will indicate which of these two track distances is greater, while the magnitude of said signal $V_R$ is representative of the difference between these track distances.

How the position of the tracks is corrected with the aid of the resulting control signal $V_R$ is irrelevant for the principle of the invention. A number of possibilities for this are known from the prior art. As an example, constructions for mounting the write-read heads to the head disc are known, which enable the heads to be adjusted in a direction transverse to the track direction. For this purpose the heads are for example mounted on the end of a piezo-electric deflection element, whose other end is connected to the head disc. By applying a control voltage to the piezo-electric element the head can then perform a controlled movement transverse to the track direction. In the present embodiment with two write-read heads $K_1$ and $K_2$ only one head need be adjusted, for example only the head $K_2$. The distance between track $S_1$ and $S_3$ then fully depends on the speed with which the record carrier 1 is passed along the drum, while by the controlled positioning of the head $K_2$, it is achieved that track $S_2$ is situated exactly midway between the tracks $S_1$ and $S_3$. If desired, both write-read heads may be controlled by controlling the positioning means for these two write-read heads differentially depending on the control signal which is obtained.

With respect to the track configuration outlined in FIG. 1, the following is to be noted. It has been assumed that consecutive tracks, with respect to their starting position on the record carrier, are always offset by a constant distance P relative to the preceding track in the longitudinal direction of the tracks. During recording of a video signal this offset P may for example correspond to one and a half line scanning periods. The length of the blanking intervals $IS_1$ through $IS_4$ is then preferably selected to equal this distance P, so that the uniform pattern shown in FIG. 1 may be used for these blanking intervals. As the beginning of each blanking interval is situated at a constant distance from the beginning of each track, the logic control unit 13 for generating the keying pulses may therefore be of extremely simple design.

Figure 3:
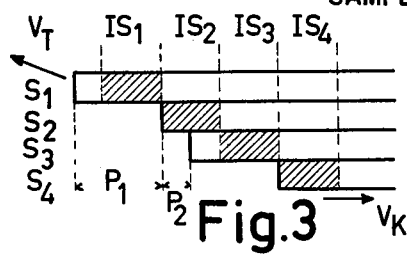
FIGS. 3 and 4 show two alternative track configurations.

If, because of the desired track configuration, a non-constant offset of the consecutive tracks is desired, the length of these intervals may be selected to equal the mean, value of this offset so as to obtain a most regular pattern of the blanking intervals IS. This is schematically represented in FIG. 3. For this it has been assumed that the offset of the tracks in the track direction is alternately $P_1$ and $P_2$, for example 1.5 and 0.5 times the line scanning period of a video signal. In order to illustrate that the directions of the movement $V_K$ of the write-read heads and the movement $V_T$ of the record carrier relative to each other is irrelevant for the principle of the invention, the movement $V_T$ of the record carrier has been reversed relative to that of FIG. 1. From the Figure it is then evident that, if the length of the blanking intervals is selected to equal the mean value of $P_1$ and $P_2$, the same uniform pattern as in FIG. 1 can be obtained for these blanking intervals $IS_1$ through $IS_4$.

The optimum length of the blanking intervals IS depends on a number of factors. On the one hand, this length, as has been stated previously, is preferably selected to equal the mean offset of the tracks relative to each other. Thus, it can be achieved in a very simple manner that when a video signal is recorded these blanking intervals always appear during the field blanking periods of said video signal. A factor which also plays a part in selecting the length of said blanking intervals is the frequency of the tracking signal, whose amplitude is to be measured in each of said blanking intervals during recording. It will be evident that for this it is necessary that during the time of such a blanking interval a sufficient number of periods of this tracking signal are available in order to enable an effective amplitude measurement.

Figure 4:
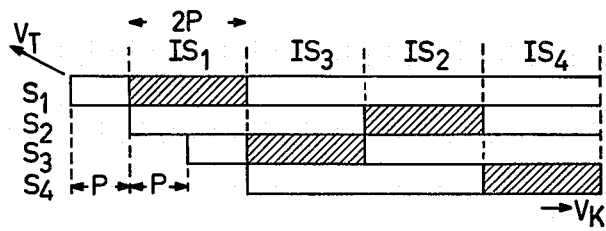

If for this tracking signal a frequency is to be selected for which, when the length of the blanking intervals is selected to equal the mean track offset, this requirement is no longer met, a less regular pattern may be selected for these blanking intervals. An example of such a pattern is shown in FIG. 4. For this it has been assumed that consecutive tracks are always offset by a constant distance P relative to each other. In order to obtain a maximum regular pattern of the blanking intervals IS, the length of these blanking intervals should therefore be P. In the track configuration shown, however, the value 2 P has been selected for the length of these blanking intervals IS, while by the positions of these blanking intervals in the consecutive tracks, it has been achieved that each blanking interval adjoins a portion of the preceding track in which a tracking signal has been recorded.

Figure 5:
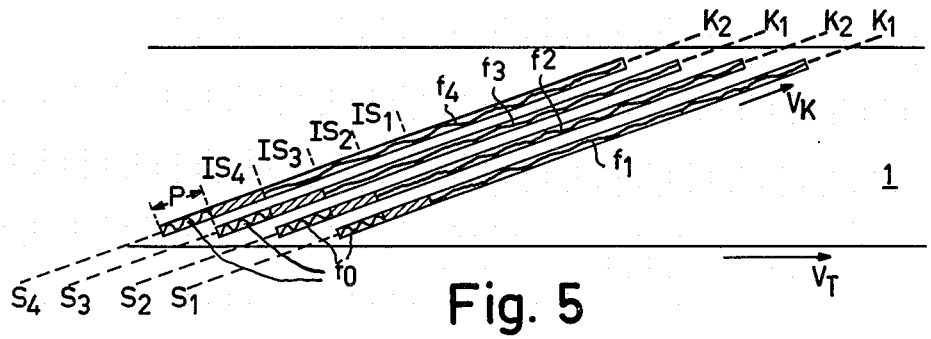

FIG. 5 shows an alternative track configuration, in which the offset P of the tracks relative to each other and the position of the blanking intervals $IS_1$ through $IS_4$ fully correspond to the track configuration in FIG. 1. However, in deviation from FIG. 1, a tracking signal with a constant frequency $f_0$ of for example 185 kHz is recorded in each interval of a track with adjoins a blanking interval in a subsequent track. As during recording of a video signal these intervals fall within the field blanking period, this tracking signal may have a greater amplitude than the tracking signals which are recorded during the entire track scanning period. Furthermore tracking signals with a frequency $f_1$ through $f_4$, for the positioning of the write read heads during reproduction, are recorded in the track portions following the blanking intervals $IS_1$ through $IS_4$ in accordance with a four-track recurrence pattern, as is indicated in the table below.

TABLE

| track | tracking signal frequency and mixing frequency | detection signal frequency | | |
|---|---|---|---|---|
| | | preceding track | following track | same track |
| $S_1$ | 105 | 45 | 15 | 0 |
| $S_2$ | 120 | 15 | 45 | 0 |
| $S_3$ | 165 | 45 | 15 | 0 |
| $S_4$ | 150 | 15 | 45 | 0 |

Thus, in the consecutive tracks $S_1$ through $S_4$ tracking signals with a frequency of 105 kHz, 120 kHz, 165 kHz and 150 kHz are recorded respectively.

Figure 6:
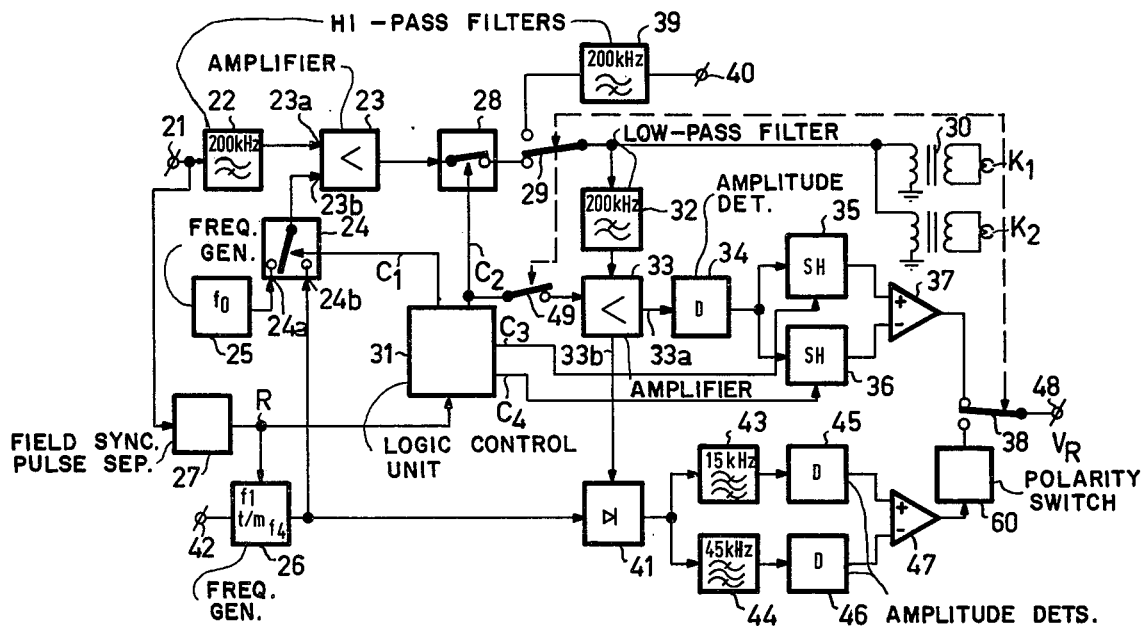
FIG. 6 shows the apparatus for obtaining said tracking configuration and producing the control signal for the positioning means.

The method of obtaining a control signal for positioning the write-read heads both during recording and playback will now be described in more detail on the basis of the apparatus shown in FIG. 6.

This apparatus first of all comprises an input terminal 21 to which for example a video signal to be recorded is applied, which input terminal is connected to a high-pass filter 22 with a cut-off frequency of 200 kHz, In its turn, this high-pass filter 22 is connected to a first input 23a of a write amplifier 23. A second input 23b of said write amplifier 23 is connected to the master contact of a switch 24, which has two inputs, namely one input 24a, which is connected to a generator 25 which generates a tracking signal with a frequency $f_0$, and an input 24b, which is connected to a generator 26 which for consecutive tracks successively generates tracking signals with frequencies $f_1$, $f_2$, $f_3$ and $f_4$. For this purpose this generator 26 may comprise a generator circuit which continuously generates these four different tracking signals and a switching unit which from track to track alternately transfers one of said tracking signals to the switch 24, while said switching unit can be synchronized by the field synchronizing pulses R which have been separated from the applied video signal via a field-synchronizing pulse separator 27.

The write amplifier 23 adds the signals at its two inputs 23a and 23b to each other and applies the combined signal to a rotary transformer 30 via a switch 28 and a switch 29, so as to record said signal via the write-read heads $K_1$ and $K_2$. The switch 29 serves for recording/playback selection, while the switch 28 serves to obtain the interruption intervals $IS_1$ through $IS_4$ during track scanning.

Figure 7:
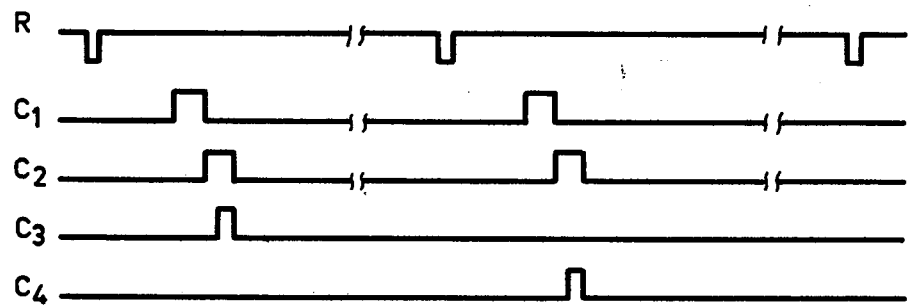
FIG. 7 represents the control signals employed in said apparatus.

The switches 24 and 28 are controlled by a logic control unit 31, which is synchronized by the field synchronizing pulses R which have been extracted from the video signal. In response to the field synchronizing pulses R this logic control unit 31 supplies a control signal $C_1$ for the switch 24, which signal each time consists of a pulse which is situated at a fixed time interval from a field synchronizing pulse, as is shown in FIG. 7. For the duration of said pulse the switch 24 assumes the position shown, so that during this time interval the tracking signal from the generator 25 with the frequency $f_0$ is applied to the write amplifier 23. For the remainder of a track scanning period the switch 24 assumes the position not shown, so that during this time one of the tracking signals generated by generator 26 is applied to the write amplifier 23. Moreover, this logic control unit 31 supplies a control signal $C_2$ to the switch 28, which signal consists of a pulse which directly follows a pulse of the control signal $C_1$, which pulse opens said switch 28 and thus determines the interruption intervals $IS_1$ through $IS_4$. By cooperation of said generators 25 and 26 and the switches 24 and 28, the track configuration shown in FIG. 5 is thus obtained.

During each interruption interval $IS_1$ through $IS_4$ the tracking signal of the frequency $f_0$ which is recorded in the adjoining portion of the preceding track, produces a cross-talk signal in the relevant write-read head $K_1$ or $K_2$. Via a low-pass filter 32 with a cut-off frequency of for example 200 kHz, this cross-talk signal is transferred to an amplifier 33. An output 33a of this amplifier is connected to an amplitude detector 34, which detects the amplitude of said cross-talk signal. The output of this amplitude detector 34 is connected to two sample-and-hold circuits 35 36, which are alternately energized from track to track during the blanking intervals IS. For this purpose the circuits 35 and 36 receive two control signals $C_3$ and $C_4$ from the logic control unit 31 in accordance with FIG. 7. Thus, two signals are available at the outputs of these two sample-and-hold circuits 35 and 36, which signals represent the amplitude of the cross-talk signal during the scanning of two consecutive tracks. A control signal $V_R$ for the positioning means of the write-read heads can then be obtained by applying these two signals to a differential amplifier 37. This control signal $V_r$ is taken from an output terminal 48, which is connected to the master contact of a switch 38, which is coupled to the switch 29, and during recording occupies the position shown.

When the recorded information is to be reproduced, the two switches 29 and 38 are in the position not shown. As a result of this, the information which has been read by the write-read heads $K_1$ and $K_2$ is first of all applied to a high-pass filter 39 with a cut-off frequency of 200 kHz, so that the recorded video signal is available at the terminal 40 for further processing. The tracking signals which have been read are again extracted by means of the low-pass filter 32 and applied to the amplifier 33. The tracking signals appearing at an output 33b of said amplifier 33 are applied to a mixing circuit 41, which is also connected to the generator 26. During reproduction this generator supplies mixing signals which always have the same frequency as the tracking signal recorded in the relevant track, i.e. in accordance with the table given with reference to FIG. 5. For this purpose this generator 26 is for example synchronized during reproduction by means of a control pulse which is generated by an element which co-operates with the head disc, which element at the beginning of each track scan supplies a pulse which is applied to the generator 26 via the terminal 42.

During reading of consecutive tracks $S_1$ through $S_4$ the detection signals appearing at the output of the mixing circuit 41 consequently have components with frequency values as given in the table associated with FIG. 5, in response to the tracking signals in the relevant and the adjacent tracks. From this table it is evident that the detection signal obtained when a track is being scanned always contains a component with a frequency of 45 kHz and a component with a frequency of 15 kHz, one of said components originating from the tracking signal in the preceding track and the other component from the tracking signal in the following track. These two components are separated with the aid of two band-pass filters 43 and 44, after which the amplitude of these two components is detected with the aid of the amplitude detectors 45 and 46. With the aid of a differential amplifier 47 the desired control signal $V_R$ for adjusting the write-read heads $K_1$ and $K_2$ can be derived from these detected amplitudes, which control signal is then transferred to the output terminal 48 via a polarity switch 60, which switches the polarity of the output signal of the amplifier 47 track-sequentially, and via the switch 38 which during playback is in the position not shown.

In order to obtain a most effective control signal during recording, it may be desirable to ensure that the amplifier 33 is operative only during the interruption intervals $IS_1$ through $IS_4$. For this purpose this amplifier 33 may receive the control signal $C_2$ from the logic control unit 31 via a switch 49 which is closed during recording. Instead of a common amplifier for control during recording and playback it is obviously possible to use separate amplifiers. The amplifier which is used for control during recording should comply with a number of stringent requirements. As an example, this amplifier should have a very low input noise and a high selectivity. Furthermore, this amplifier should be insensitive to large common-mode input signals which appear during the inactive period of said amplifier, while furthermore rapid turn-on should be possible without the occurrence of transient effects at the outputs.

Figure 8:
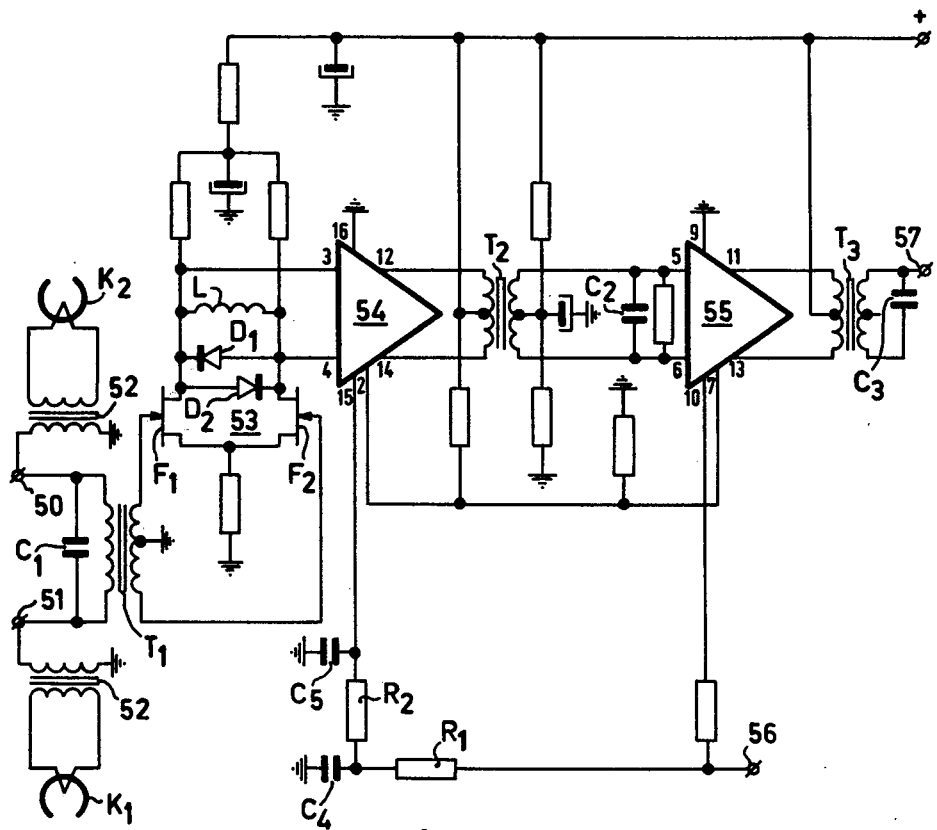
FIG. 8 finally shows an example of the read amplifier employed in the apparatus in accordance with the invention.

FIG. 8 shows an amplifier which meets these requirements in a satisfactory manner. It has been assumed that this amplifier only serves to detect and amplify the cross-talk signal in the interruption intervals during recording.

Furthermore, the amplifier comprises two input terminals 50 and 51 which are each coupled to one of the write-read heads $K_1$ and $K_2$ via a separate half of the rotary transformer 52. The signals at these two input terminals 50 and 51 are transferred to the first amplifier stage 53 via a balanced transformer $\overline{T}_1$, which is tuned to the frequency $f_0$ with the aid of the capacitor $c_1$. By means of this arrangement a preliminary rejection of common-mode signals at the two input terminals is achieved, which signals are produced at these terminals by the write amplifier during recording.

The first amplifier stage 53 which comprises two field-effect transistors $F_1$ and $F_2$, which are connected as a differential pair, is continuously operative in order to prevent turn-on transients. Between the drain electrodes of these two field-effect transistors $F_1$ and $F_2$ two diodes $D_1$ and $D_2$ have been included in anti-parallel in order to prevent the second amplifier stage from being overdriven, while with the aid of the coil L, the D.C. voltage between these two drain-electrodes is short-circuited.

The second and third amplifier stages are each constituted by one half of a push-pull mixing amplifier of the type TCA 240. The second amplifier stage 54 is switched by switching the internal current source via pin 15. The switching signal is then derived from the control signal $C_2$ of the logic control unit 31 being applied to a terminal 56 and a delay network, comprising the resistors $R_1$ and $R_2$ and the capacitors $c_4$ and $c_5$, which serves to ensure a gradual turn-on of the second amplifier stage 54 slightly later than the turn-off of the write amplifier 23.

Said second amplifier stage 54 is coupled to the third amplifier stage 55 with the aid of a balanced transformer $T_2$, which is tuned to the frequency $f_0$ of the tracking signal with the aid of a capacitor $c_2$. This third amplifier stage 55 is switched rapidly by the control signal $C_2$ in order to prevent transient effects when the write amplifier 23 is turned on again. This third amplifier stage 55 is finally coupled to an output terminal 57 via a transformer $T_3$ which is tuned to the frequency $f_0$ with the aid of a capacitor $c_3$, so that the detected cross-talk signal is available at said output terminal 57.

Although the embodiments are each based on a record carrier in the form of a tape, it will be evident that the invention may also be used when different types of record carriers are used, such as disc-shaped record carriers. Neither is the invention limited to magnetic recording and reading, but it is also applicable to record carriers in which the information is for example recorded and read electrostatically or optically.

Furthermore, each of the embodiments described is based on a track configuration employing a blanking interval IS in each track. However, recording systems for video signals are conceivable in which this may give rise to problems. As an example a track configuration may be required, in which not every track contains one field of the video signal, but in which each field is divided over for example 5 consecutive tracks. In that case it is problematic to record blanking intervals in the 2nd through 5th tracks, because these blanking intervals would then be situated in that part of a field which is to be reproduced. In accordance with the invention it is then possible only to include a blanking interval in every first track of such a set of 5 tracks and to record a tracking signal in the portion of the preceding track adjoining said blanking interval. When two write-read heads are used it is then again possible by detection of the cross-talk signals, detected during each of these blanking intervals, to control the position of these two write-read heads relative to each other. Obviously, positioning is then effected during scanning of the first track of such a set of tracks, after which during scanning of the remaining tracks of each set the relative head position then occupied is maintained.

Furthermore, it is to be noted that the method in accordance with the invention may be used in conjunction with any system for controlling the position of the write-read head during reproduction. Examples of such systems have already been given in FIG. 6, the cited U.S. Pat. No. 4,056,832, and U.S. Pat. No. 4,110,799.

Finally it is to be noted that the invention is by no means limited to the examples given in the Figures. It is evident that especially in respect of the design of the apparatus a large number of variations are possible which are obvious to those skilled in the art.

What is claimed is:

1. A device for controlling the position of a write-read head in a recording apparatus relative to a record carrier while recording on said record carrier, said device comprising a write-read head for recording information on the record carrier, positioning means for controlling the relative position of the write-read head with respect to information tracks being recorded on said record carrier in a direction transverse to said information tracks, and a control circuit for generating and applying a control signal to said positioning means, wherein the device further comprises a signal generator for applying, at least during a first time interval, a tracking signal to the write-read head, switching means for interrupting the supply of signals to the write-read head during a second time interval, and detection means for detecting the cross-talk signal during the second time interval, resulting from the tracking signal from the preceding information track, and for applying the detected signal to the control circuit.

2. A device, as claimed in claim 1, wherein the control circuit comprises an amplitude detector for determining the amplitude of the cross-talk signal, a first and a second sample-and-hold circuit each coupled to the amplitude detector, an actuating circuit for alternately actuating said first and second sample-and-hold circuits during consecutive second time intervals, and a differential amplifier for adding the output signals of the first and second sample-and-hold circuits to each other with opposite polarity so as to obtain the control signal.

3. A method for controlling the position of a write-read head which cooperates with a record carrier on which consecutively adjacent parallel information tracks are being written, wherein the method comprises:
   recording a tracking signal for at least a first time interval during the writing of an information track;
   interrupting the supply of a write signal to the write-read head for a second time interval during the writing of a subsequent track;
   selecting said first and said second time intervals such that the portion of the first-mentioned information track corresponding to said first time interval adjoins that portion of the subsequent information track corresponding to said second time interval;
   detecting the cross-talk signal, produced in the write-read head during the second time interval in the writing of said subsequent information track; and
   generating a control signal from the cross-talk signal for positioning the write-read head.

4. A method as claimed in claim 3, wherein said recording of said tracking signal is performed during an interval corresponding to said first time interval during the writing of each information track, said interrupting of said write signal supply is performed during an interval corresponding to said second time interval during the writing of each information track, and said detecting of the cross-talk signal, resulting from the tracking signal in the preceding information track, is performed during the second time interval of each information track.

5. A method as claimed in claim 4, wherein the tracking signal recorded always has the same frequency during each first time interval.

6. A method as claimed in claim 4 or 5, wherein the length of the second time interval is selected so that the track portion corresponding to said second time interval has a length which at the most is equal to the mean value of the offset of consecutive information tracks in the track direction relative to each other.

7. A method as claimed in claim 6, a television signal being recorded on the record carrier, wherein every second time interval is situated within the field blanking period after the field synchronizing pulse of the television signal.

8. A method as claimed in claim 7, wherein the control signal for positioning the write-read head is obtained by comparison of the cross-talk signal which is detected in the second time interval during recording of an information track with a cross-talk signal detected in a preceding second time interval during recording of a preceding information track.

* * * * *